US008327705B2

(12) United States Patent
Hsu et al.

(10) Patent No.: US 8,327,705 B2
(45) Date of Patent: Dec. 11, 2012

(54) FREQUENCY MODULATED MICRO-GYRO SIGNAL PROCESSING METHOD AND DEVICE

(75) Inventors: Ying Hsu, San Clemente, CA (US); Gary Gottlieb, Irvine, CA (US); Clint Kopper, Oceanside, CA (US)

(73) Assignee: ISC8 Inc., Costa Mesa, CA (US)

( * ) Notice: Subject to any disclaimer, the term of this patent is extended or adjusted under 35 U.S.C. 154(b) by 319 days.

(21) Appl. No.: 12/806,339

(22) Filed: Aug. 9, 2010

(65) Prior Publication Data
US 2011/0041601 A1    Feb. 24, 2011

Related U.S. Application Data

(60) Provisional application No. 61/273,844, filed on Aug. 10, 2009.

(51) Int. Cl.
*G01C 19/56*    (2006.01)
(52) U.S. Cl. .................................. 73/504.12; 73/504.13
(58) Field of Classification Search ............... 73/504.12, 73/504.13, 504.02, 504.04, 504.08, 1.77
See application file for complete search history.

(56) References Cited

U.S. PATENT DOCUMENTS

| 4,574,245 | A  | * | 3/1986 | Mickelson | ............... 73/504.03 |
| 7,565,839 | B2 | * | 7/2009 | Stewart et al. | ............. 73/504.12 |
| 7,694,561 | B2 | * | 4/2010 | Steinlechner | ............. 73/504.02 |
| 2010/0095770 | A1 | | 4/2010 | Hsu | |

* cited by examiner

*Primary Examiner* — Helen C. Kwok
(74) *Attorney, Agent, or Firm* — W. Eric Boyd, Esq.

(57) ABSTRACT

A signal processing method and device for measuring the input rate of an FM micro-gyro having a modulation frequency $F_M$ and having an oscillator sense element having a nominal frequency $F_{OSC}$ is disclosed.
In a first aspect of the invention, the method comprises defining a first time interval $T_{WN}$ and a second time interval $T_{WP}$ and measuring the first time interval and the second time interval by counting the number of periods of a predetermined reference frequency. The nominal frequency of the oscillator sense element $F_{OSC}$ is measured along with the modulation frequency $F_M$. From these measurements, the proof mass period $N_W$ is calculated. The time difference $\Delta t$ is calculated from the above measurements. The method then comprises calculating a modulation M that produced the measured $\Delta t$, preferably using an iterative method.
From the above, the input rate $\Omega$ is calculated by dividing M by a sensitivity S of the FM micro-gyro.
The above method and other methods for signal processing for measuring the input rate of an FM micro-gyro are disclosed herein.

1 Claim, 4 Drawing Sheets

FREQUENCY MODULATED MICRO-GYRO SIGNAL PROCESSING METHOD AND DEVICE

CROSS-REFERENCE TO RELATED APPLICATIONS

This application claims the benefit of U.S. Provisional Patent Application No. 61/273,844, filed on Aug. 10, 2009, entitled "Frequency Modulated Gyro" pursuant to 35 USC 119, which application is incorporated fully herein by reference.

STATEMENT REGARDING FEDERALLY SPONSORED RESEARCH AND DEVELOPMENT

This invention was made with Government support under Contract No. W909-MY-09-X-0007 awarded by the United States Army.

The Government has certain rights in the invention.

FIELD OF THE INVENTION

The invention relates generally to the field signal processing relative to inertial measurement devices. More specifically, the invention relates to signal processing methods and devices for determining an angular velocity using a frequency-modulated micro-gyro (also referred to as an "FM micro-gyro" herein).

BACKGROUND OF THE INVENTION

Military and commercial users seek high-precision micro-gyroscopes ("micro-gyros" herein) fabricated from MEMS processes for a number of applications including use in guidance systems and for sensing angular rotation in vehicles and equipment.

For the next generation of high-precision micro-gyro, a heightened set of performance specifications must be met; particularly for military and space applications. Current technology trends suggest the need for a micro-gyro having a bias stability better than <0.01 deg/hr, an angle random walk of better than <0.003 deg/rtHr and an azimuth accuracy of at least ±1 mil.

Prior art vibratory micro-gyros are ideally suited for hand-held applications due to their small size, low weight and low power. Vibratory micro-gyros are widely used in the aerospace, consumer and automotive markets. Prior art vibratory micro-gyros are typically micro-machined using established MEMS foundry processes, are fabricated from silicon or quartz materials and can be produced at relatively low cost (less than $10/unit) in automotive quantities.

Unfortunately, existing MEMS vibratory micro-gyros cannot meet the challenging performance specifications set forth above.

Relatedly, despite a decade of development and hundreds of million dollars of investment, prior art vibratory micro-gyros have also not yet met the performance specifications of the more accurate, higher tolerance prior art optical micro-gyros.

Prior art optical gyros, on the other hand, have not been able to reduce their size and manufacturing costs, thus limiting their application to expensive systems such as in aircrafts and missiles.

One major factor that limits the performance of the above prior art micro-gyro devices is the signal processing methodology used to process the output signal of the micro-gyro itself. The methods used are based primarily on the physical operation and structure of such devices.

Almost all micro-gyros function in part as amplitude modulated (AM) transducers. The instant invention discloses a new type of micro-gyro signal processing method that processes the frequency-modulated (FM) output signal of a frequency-modulated micro-gyro, i.e., a micro-gyro that produces an output signal with a frequency that is modulated by the input rate. The method of the invention dramatically improves noise suppression by about two orders of magnitude as compared to prior art micro-gyros operating based on amplitude modulation.

Due to the small physical structure of prior art micro-gyros, the proportionately small output signals require large amplification. Accordingly, it is well-understood by those skilled in the art of MEMS micro-gyro technology that a major limiting factor in micro-gyro performance is noise in the associated signal processing electronics. A micro-gyro element that generates an FM output signal on the other hand beneficially provides an efficient output signal to minimize the noise element in a micro-gyro output signal.

Before detailing the signal processing methods that are the subject of the invention, the basic elements of an exemplar prior art FM micro-gyro structure are briefly discussed. Such a prior art FM micro-gyro is disclosed for instance in the United States utility patent application entitled "Frequency Modulated Micro Gyro", U.S. Pub. No. 2010/0095770, dated Apr. 22, 2010 to Hsu, the entirety of which is incorporated herein by reference.

Turning now to the figures wherein like numerals define like elements among the several views, FIG. 1 depicts the fundamental structural elements of a prior art FM micro-gyro.

In the depicted embodiment of FIG. 1, the FM micro-gyro structure comprises a single monolithic drive element fabricated from a MEMS process wherein the drive element is suspended in space, making contact with the substrate at the central anchor. The exemplar FM micro-gyro structure comprises a drive element (also referred to as a "proof mass" herein), a central anchor, a drive electrode, an oscillator, an oscillator anchor and a support flexure.

The structure defining the oscillator sense elements and oscillator anchor comprises a resonator structure.

The FM micro-gyro is disposed in space with respect to a drive axis, a rate axis and a sense axis.

The underlying principal behind an FM micro-gyro is similar to the phenomenon observed in the tuning of a guitar string. This example can be used to illustrate the principal of converting the Coriolis force into a shift in the resonant frequency of an oscillator sense element on a resonator. The oscillator sense element's resonant frequency is determined by its mass and its stiffness. The Coriolis force is applied to one end of the oscillator sense element with the other end connected to the stationary oscillator anchor.

The change in the tension of the resonator's oscillator sense elements causes a shift in the resonant frequency of the oscillation, in the same manner that the increasing or decreasing of the tension on a guitar string changes the resonant frequency of the string.

In operation, the drive element on the FM micro-gyro is electronically driven to oscillate rotationally about the drive axis such as by an electrostatic drive means. When the oscillating element experiences an angular rate change (also referred to as an input rate) about the rate axis, a Coriolis force is generated about the sense axis. Directing the resultant Coriolis force to vary the tension on the oscillator sense element provides a means to shift the resonant frequency of the one or more oscillator sense elements.

Capacitive electrodes are used to actuate and detect all elements in the device. The sense oscillator is configured such that the output Coriolis force creates a shift in the resonant frequency of the oscillator sense element. A sensed change in capacitance is implemented in the device to convert movements of the oscillator sense elements into a voltage or current output signal. The output signal is then passed through a signal processing FM detection circuit to extract the rate change information.

Prior art vibratory micro-gyros (as distinguished from FM micro-gyros) generally operate and produce an output signal based on an input rate in the following manner: A drive element is driven to oscillate at a predetermined resonant frequency about the drive axis of the device. When the oscillating element is subjected to an angular velocity about the rate axis, a force is generated about the sense axis; all three axes being orthogonal to one another. The resulting Coriolis force has a magnitude that is proportional to the product of the oscillator's mass, its velocity and its angular rate. Virtually all vibratory micro-gyros rely on this same Coriolis principle of operation for sensing the angular rate of the device.

In the instance of vibratory micro-gyros, the Coriolis force is extremely small (pico-Newtons) and is calculated by measuring the micro-rotation of the drive element about the sense axis. At very low angular rates, the movement of the element may only be about the size of an atom. This very small movement is typically detected by changes in capacitance between two elements in the device, which capacitance change is measured using a suitable readout circuit.

Ultimately, the output of the readout circuit from a vibratory micro-gyro provides an electronic signal that is proportional to the amplitude of an input angular rate change.

As can be seen, vibratory micro-gyros effectively have an output signal that is amplitude modulated (AM) by an angular rate.

In contrast, the frequency-modulated micro-gyro such as depicted in FIG. 1 produces an output signal that is frequency-modulated by the angular input rate. The FM micro-gyro has at least one oscillator sense element connected by an oscillator anchor support beam to the drive element where a responsive Coriolis force is directed to alter the tension thereon and shift the resonant frequency of the oscillator sense elements.

As contemplated by FIG. 1, an output Coriolis force will cause the ring-shaped drive element to rotate about the "sense axis", thus altering the tension on the oscillator anchors connected to the oscillator sense elements. Electrodes underneath the drive element are connected to actuate and sense the elements by electrostatic effects.

The above-referenced FM micro-gyro technology provides important advantages when compared to micro-gyros operating based on amplitude modulation. These advantages include:

1. FM Gyros have high resolution and low noise when compared to AM micro-gyros: A high-performance AM micro-gyro is generally limited to measuring amplitude changes of 0.1 deg/sec over 100 deg/sec in full scale, or 0.1%. Undesirably, numerous noise sources exist in AM micro-gyros including amplifier noise, voltage reference noise, and resistor noise. Despite the best filtering and demodulation techniques, a significant amount of noises still passes through in these devices, limiting the resolution.

2. Frequency stability: The stability of micro-gyros is due in large part to stability of its signal processing electronics. The slow shift in voltage sources is common and is an example of a component or system issue that limits the performance of a prior art micro-gyro having, as an example, a typical voltage stability of about 50 ppm.

On the other hand, an FM micro-gyro relies on a frequency source for the control of its oscillator sense elements. Very stable frequency sources are readily available with stability of just a few ppm. A stable reference source combined with excellent filtering in FM signal processing technology leads to superior performance in an FM micro-gyro as compared to an AM micro-gyro.

3. High bias stability: A bias stability specification of <0.01 deg/hr is about two orders of magnitude higher than commercially produced prior art "high performance" micro-gyros. Despite tremendous advances made in the performance of current micro-gyros, an order of magnitude improvement is not expected and unlikely as is available from an FM micro-gyro.

4. Low angle random walk: Angle random walk is a direct measure of noise in a micro-gyro. The superior noise filtering techniques available in FM signal processing electronics enable an FM micro-gyro to far exceed the performance of AM micro-gyros. The use of FM detection circuitry provides up to a two order of magnitude in noise reduction over prior art devices.

Because the shifts in the output frequency of an FM micro-gyro are not large, the invention herein is directed at providing signal processing approaches for measuring ultra-low frequency shifts resulting from an input angular rate change of an FM micro-gyro.

In a first aspect of the invention, a first method for processing an output signal of an FM micro-gyro uses a cumulative time difference technique referred to herein as a windows subtraction method. The windows subtraction method can detect a frequency shift as small as 0.1 Hz on, for instance, an exemplar 2 MHz resonator and enables an FM micro-gyro to measure very low rotational rates in the range of 1e-5 deg/sec.

The windows subtraction method desirably has a low sensitivity to jitter noise and is implemented using relatively simple hardware. The time for signal processing for this method is as low as between about 0.3 and 2.5 seconds, depending on the level of confidence desired by the user or application.

SUMMARY OF THE INVENTION

A signal processing method for measuring the input rate of an FM micro-gyro having a modulation frequency $F_M$ and having a resonator comprising an oscillator sense element having a nominal frequency $F_{OSC}$ is disclosed.

In a first aspect of the invention, the method comprises defining a first time interval $T_{WN}$ and a second time interval $T_{WP}$ and measuring the first time interval and the second time interval by counting the number of periods of a predetermined reference frequency.

The nominal frequency of the oscillator sense element $F_{OSC}$ is measured along with the modulation frequency $F_M$. From these measurements, the proof mass period $N_W$ is calculated. The time difference $\Delta t$ is calculated from the above measurements. The method then comprises calculating a modulation M that produced the measured $\Delta t$, preferably using an iterative method.

From the above, the input rate $\Omega$ is calculated by dividing M by a sensitivity S of the FM micro-gyro.

The above method and other methods for signal processing for measuring the input rate of an FM micro-gyro are disclosed herein.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

With respect to the FM micro-gyro signal processing method of the invention, a basic understanding of the physical operation of the FM micro-gyro structure is assistive. Selected aspects of the physical principles of operation of an FM micro-gyro and related output signal that is generated as the result of a rotation are as follows:

The proof mass oscillation causes the oscillator sense elements of the resonator's frequency modulation:

$$F_{RES}(t) = F_{OSC} + M \sin(2\pi F_M t)), \quad \text{Eq. 1}$$

where $F_{RES}$—modulated frequency of the oscillator sense elements of the resonator;

$F_{OSC}$—natural (not modulated) frequency of the oscillator sense elements of the resonator;

$F_M$—proof mass frequency, which modulates $F_{OSC}$;

M—frequency deviation described as $$M = \Omega * S, \quad \text{Eq. 2}$$

$\Omega$—applied rate (degree/second)

S—sensitivity (frequency/degree/second). (10 kHz/°/s est.)

Figure 1:
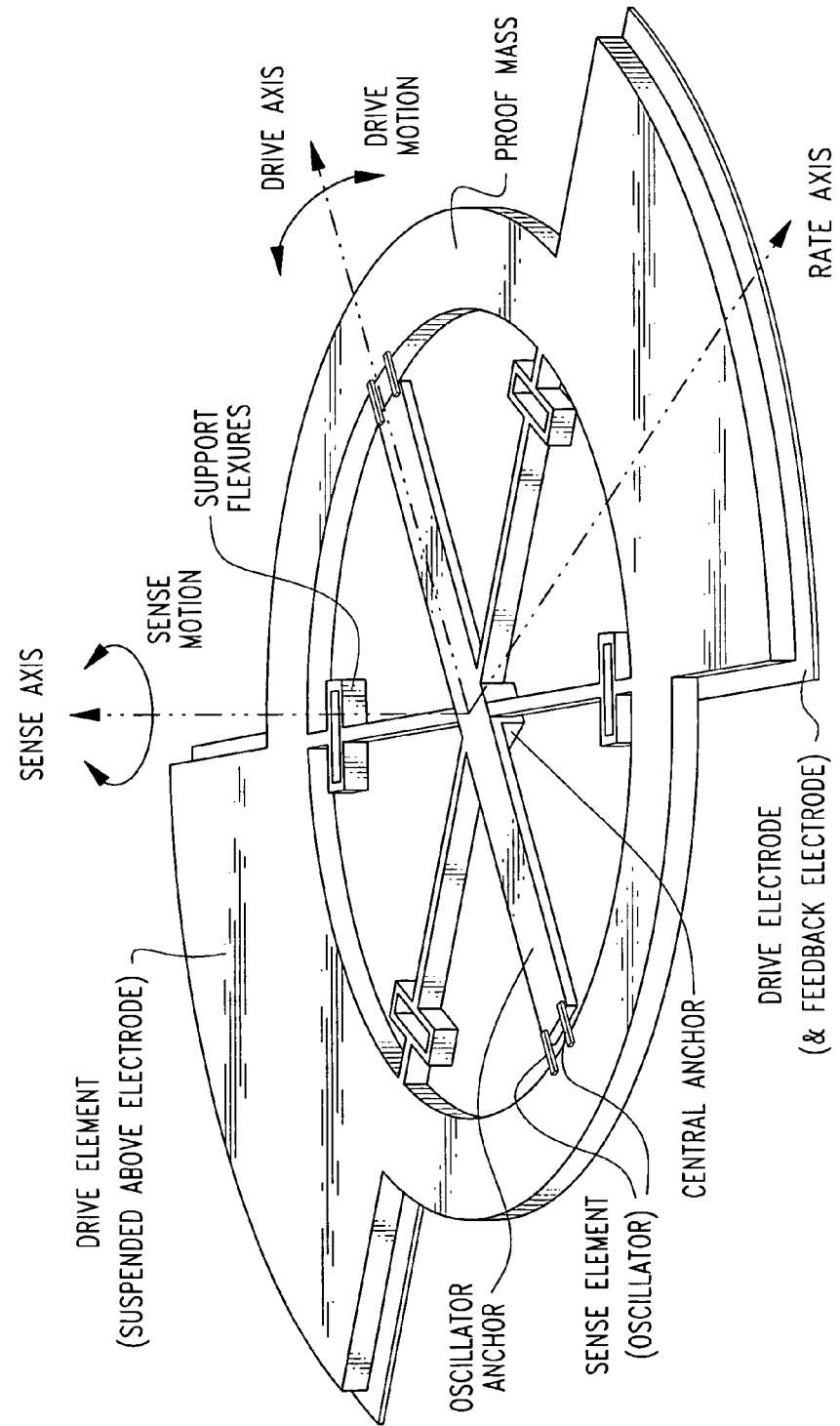
FIG. 1 depicts the basic structural elements of a prior art FM micro-gyro device.
Figure 2:
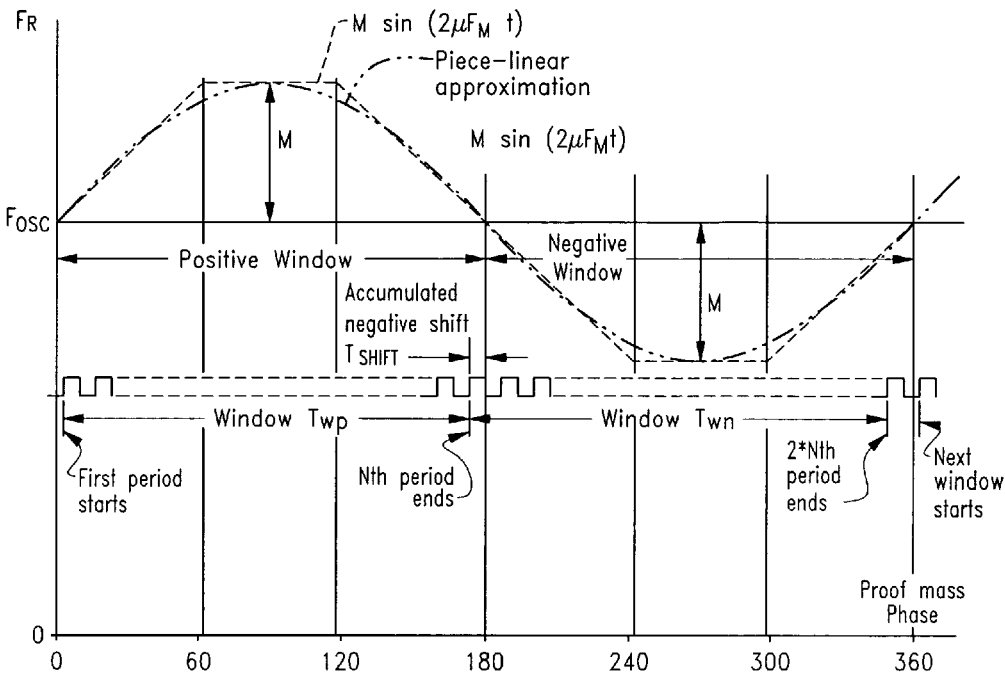
FIG. 2 depicts a graphical representation of Eq. 1 of the Detailed Description of the Invention showing resonator frequency as a function of the proof mass phase of an FM micro-gyro.

FIG. 2 is a graphical representation of Eq. 1.

As is seen, during the first half period of the modulation frequency $F_M$ ("positive window"), modulated frequency $F_{RES}$ increases from nominal (unmodulated) $F_{OSC}$ to a maximum and then returns to the nominal again.

During the second half of the period ("negative window"), $F_{RES}$ decreases to a minimum and then returns to the nominal value.

The amplitude-normalized output signal $V_{RES}$ from the oscillator sense elements of the resonator (for instance, voltage from a capacitive reader) is then:

$$V_{RES} = \sin\left(2\pi \int_0^t F_{RES}(\tau)d\tau\right) = \sin\left(2\pi F_{OSC}t + 2\pi M \int_0^t \sin 2\pi F_M(\tau)d\tau\right) \quad \text{Eq. 3}$$

Finally, $$V_{RES} = \sin(2\pi F_{OSC}t - (M/F_M)\cos(2\pi F_M t))$$

The coefficient before the cosine function is defined as a modulation index "h" and is the ratio of frequency deviation M to modulation frequency $F_M$:

$$h = (M/F_M) \quad \text{Eq. 4}$$

The change of the oscillator sense elements oscillation period over time is then calculated. In Eq. 3, $V_{RES}=0$ each time the argument of the cosine function is equal $2\pi*N$, where N is the number of oscillator sense elements periods. That is, $$2\pi F_{OSC}t - (M/F_M)\cos(2\pi F_M t) = 2\pi N \quad \text{Eq. 5}$$

At a zero rate, M=0, and Eq. 5 becomes the expected trivial case:

$$2\pi F_{OSC}t = 2\pi N$$

For any rate other than zero, Eq. 5 is solved numerically.

An input rate in the form of rotation applied to the FM micro-gyro directly impacts frequency modulation M.

As is seen, Eq. 5 has two unknown parameters; the "M" and the "t". The objective is to measure the rate calculated from M (Eq. 2), and, which in turn can be calculated from Eq. 5 if "t" is known. In other words, it is necessary to measure the moments "t" when Eq. 5 has been satisfied and then calculate M. Thereafter, the rate $\Omega$ from Eq. 2 is determinable.

At least three rate measurement methods of the invention are now described below along with related electronic circuitry for certain measurements thereof.

Windows Subtraction Method

An analysis of FIG. 2 leads to important conclusions relating to a preferred embodiment of the signal processing measurement method of the invention.

First, it is observed that $F_{RES}$ returns to the nominal unmodulated value at times when the proof mass oscillation phase is equal to $\pi*P$, where P is an integer number. Cases P=1 and P=2 are depicted in FIG. 2. Rate $\Omega$ affects frequency modulation "M" shown as the amplitude of the sine wave in FIG. 2.

Second, it is observed the period of the oscillator sense element's oscillation reduces from the nominal $F_{OSC}$ and then returns to the nominal during the first half period of the proof mass oscillation frequency $F_M$ ("positive window" in FIG. 2). During the second half of the period, the oscillator sense element's period increases from the nominal value to maximum and then returns to the nominal ("negative window" in FIG. 2).

The oscillator sense element's signal periods are shorter than the nominal in the positive window and they are longer than nominal in the negative window. The total period reduction accumulates towards the mid-period of the modulation signal.

In a general case, frequencies $F_{OSC}$ and $F_M$ are not correlated. Accordingly, the positive and negative windows are not exactly equal to the half period of the modulation frequency $F_M$.

They can be defined as the duration of integer number $N_W$ of the periods of the oscillator sense element's frequency $F_{RES}$ fitting in ½ modulation frequency period, which is the proof mass period. Based on the second observation above, either $F_{OSC}$ or $F_{RES}$ can be used in Eq. 6:

$$N_W = \left[\frac{F_{OSC}}{2*F_M}\right] \quad \text{Eq. 6}$$

(The "[. . . ]" notation indicates that only integer part of the ratio is considered.)

In the positive window, $N_W$ periods of $F_{RES}$ create a time interval $T_{WP}$. It is then evident that $T_{WP} < (N_W/F_{OSC})$ because the periods are shorter than nominal in that window. The same number of periods in the negative window create a time interval $T_{WN}$, which is longer than $(N_W/F_{OSC})$.

The accumulated shift is then measurable as the difference:

$$\Delta t=(T_{WN}-T_{WP})/2 \qquad \text{Eq. 7}$$

Then the rate $\Omega$ is determined from Eq. 2.

The following steps in a method for measurement of the rate output signal of an FM micro-gyro based on Eq. 1 comprise:

1) Measure nominal frequency of the oscillator sense element $F_{OSC}$;
2) Measure modulation frequency $F_M$;
3) Calculate $N_W$ from Eq. 6;
4) Measure the time difference $\Delta t$ from Eq. 7 using time interval accumulation where desired;
5) Using iterative methods from Eq. 5, calculate the modulation M that caused the measured $\Delta t$. Allowed error defines required number of iterations. $N_W$ periods from Step 3 and measured $\Delta t$ from Step 4 are other parameters used for the calculation.
6) Calculate the rate from Eq. 2.

To follow Step 3 in the algorithm above, time intervals $T_{WN}$ and $T_{WP}$ are first created, then are each measured by counting the number of periods of a predetermined reference frequency.

A benefit of above method of time interval measurement over prior art time interval measurement methods comes from the extremely low value of the required resolution. As is shown below, a practical sample case requires only about a 1.6 ps resolution. A prior art method would require a reference frequency higher than $1/(1.6*10^{-12})=625$ GHz which technically not feasible based on the current state of technology.

The above method accumulates measurements for many consecutive pairs of windows to permit the use of a practically reasonable reference frequency. The results are accumulated over the predetermined time and the $\Delta t$ is then calculated.

The probability of getting one count of a difference between results is proportional to the ratio:

(required time resolution $T_{RES}$)/(period of reference frequency $F_{REF}$)

In other words, there is a probability of getting one count of a difference if the measurement is repeated $R_W$ times:

$$R_W=1/(T_{RES}*F_{REF}) \qquad \text{Eq. 8}$$

One $\Delta t$ measurement requires at least one of the periods $T_M$ of the proof mass frequency. Since extra counts are rather random events, results become statistically more valuable when the measurement is repeated at least $10*R_W$ or even $100*R_W$ times.

A non-limiting example of a practical $F_{REF}$ using the current state of technology is available from ON Semiconductor which provides the GigaComm family of digital logic designed for an 8 GHz to 10 GHz clock. The ON Semiconductor NBSG53A is an example of a flip-flop in the Giga-Comm family suitable for use with the invention.
For $F_{REF}=5$ GHz, $$R_W=1/(1.6*10^{-12}\,s*5*10^9\,Hz)=125 \qquad \text{Eq. 9}$$

One measurement requires $T_M=1/F_M=100$ us. A statistically reliable measurement time is therefore:

$$100*R_W*T_M=100*125*100\,\mu s=1.25\,s \qquad \text{Eq. 10}$$

The exemplar simplified engineering calculation below is based on a piece-linear approximation of the modulation signal $F_M$ and assumes $F_{OSC}=2$ MHz and $F_M=10$ kHz. Note that as many as 2 MHz/10 kHz=200 periods will fit into one period $T_M$ of the proof mass frequency in the assumed operation.

A piece-linear approximation of the $F_M$ is a short way to practical results with an acceptable error. A typical approximation for a sine wave is a trapezoidal signal; its minimum and maximum values are equal to the amplitude of the sine for 15% of a period, while rising and falling edges are as long as 35% of a period.

FIG. 2 shows this approximation.

The nominal frequency is $F_{OSC}=2$ MHz, its period is 500 ns. At maximum deviation the frequency becomes $(F_{OSC}+M)=2.01$ MHz, its period is 497.51 ns.

On the rising edge of the trapezoidal signal, the period of the modulated frequency changes from $1/F_{OSC}$ to $1/(F_{OSC}+M)$. On the falling edge it changes in other direction. Since the change is linear, one can replace the changing period with its mid-value of $\frac{1}{2}*(1/F_{OSC}+1(F_{OSC}+M))$. The total of $F_{OSC}/F_M=200$ periods of $F_{OSC}$ fit in one modulation period. The combined duration of the rising and falling edges is equal to 35% of the $1/F_{OSC}$; e.g., $0.35*200=70$ periods of $F_{OSC}$ fit into the combined duration of both edges. During the top of the trapezoidal signal, the period of the modulated signal is $1/(F_{OSC}+M)$ and $0.15*200=30$ periods of $F_{OSC}$ fit in it.

In the positive window, each period is shorter than the nominal because $F_{RES}>F_{OSC}$. In result, by the end of the positive window, the last (the $100^{th}$) fitting period of the $F_{RES}$ occurs earlier than if M=0.

That negative shift is:

$$\Delta t=70*\{1/F_{OSC}-\tfrac{1}{2}*[1/F_{OSC}+1/(F_{OSC}+M)]\}+30*[1/F_{OSC}-1/(F_{OSC}+M)] \qquad \text{Eq. 11}$$

Using the numbers for this practical case, one can calculate a negative shift of:

$$70*[500\,ns-\tfrac{1}{2}*(500\,ns-497.51\,ns)]+30*(500\,ns-497.51\,ns)=161.85\,ns$$

The relative resolution of the measurement in the above example is $10^{-5}$, or 1.62 ps in time units.

With knowledge of the sensitivity S of the FM micro-gyro, the oscillator sense element's nominal frequency $F_{OSC}$ and modulation frequency $F_M$, one can calculate the rate $\Omega$ from the Eq. 11 above.

Per Eq. 8, a minimum measurement time required is $R_W*T_M$. A reasonable measurement time is 10× to 100× the minimum measurement time. The measurement time creates an observation window yielding a rate that is averaged over that window.

Consider the observation windows one after another at $F_{OBS\_W}$ frequency. A rate change can be described by a frequency response of such sequential measurement, which, in turn, is defined by the sampling function Eq. 12:

$$\sin(\pi F_{OBS\_W}t)/(\pi F_{OBS\_W}t) \qquad \text{Eq. 12}$$

To calculate the rate the user must know or measure the following:
1. Sensitivity S. This parameter is defined by the FM micro-gyro design;
2. Frequencies $F_{OSC}$ and $F_M$ can be measured with well-known methods. Typically, the unmodulated frequency $F_{OSC}$ is not readily available. However, over long enough accumulation period, the modulation will be averaged away;
3. Accumulated shift $\Delta t$ (Step 4 of the algorithm).

Figure 3:
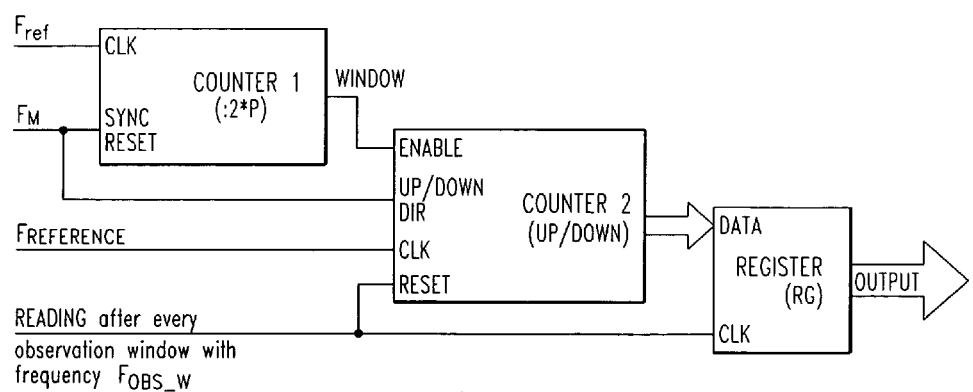
FIG. 3 depicts a preferred embodiment of a circuit for implementing an accumulated shift meter.

Turning now to FIG. 3, a preferred embodiment of an accumulated shift meter circuit is depicted.

In general, $F_{OSC}$ and $F_M$ are not correlated. To avoid problems with an extra $F_{OSC}$ period on the border between positive and negative windows, the circuit of the invention permits the COUNTER_1 to count an even number (2*P) periods of the frequency $F_{OSC}$.

The circuit of FIG. 3 generally operates as follows: COUNTER_1 synchronously resets at the beginning of each $T_M$ period and then counts 2*P periods of $F_{RES}$. This creates a window of an even number of oscillator sense element periods within $T_M$. The sign of the modulation signal controls what direction the COUNTER_2 is counting. During the window created by the COUNTER_1, the COUNTER_2 counts UP while the modulation signal is positive and it counts DOWN while modulation signal is negative.

At the end of the $T_M$ period, the counter holds the difference between the number of $F_{REF}$ periods fitting into the positive window and number of periods fitting into the negative window.

Remaining calculations per Step 5 of the algorithm are preferably executed using suitable computer hardware and software.

Time Stamp Method

Figure 4:
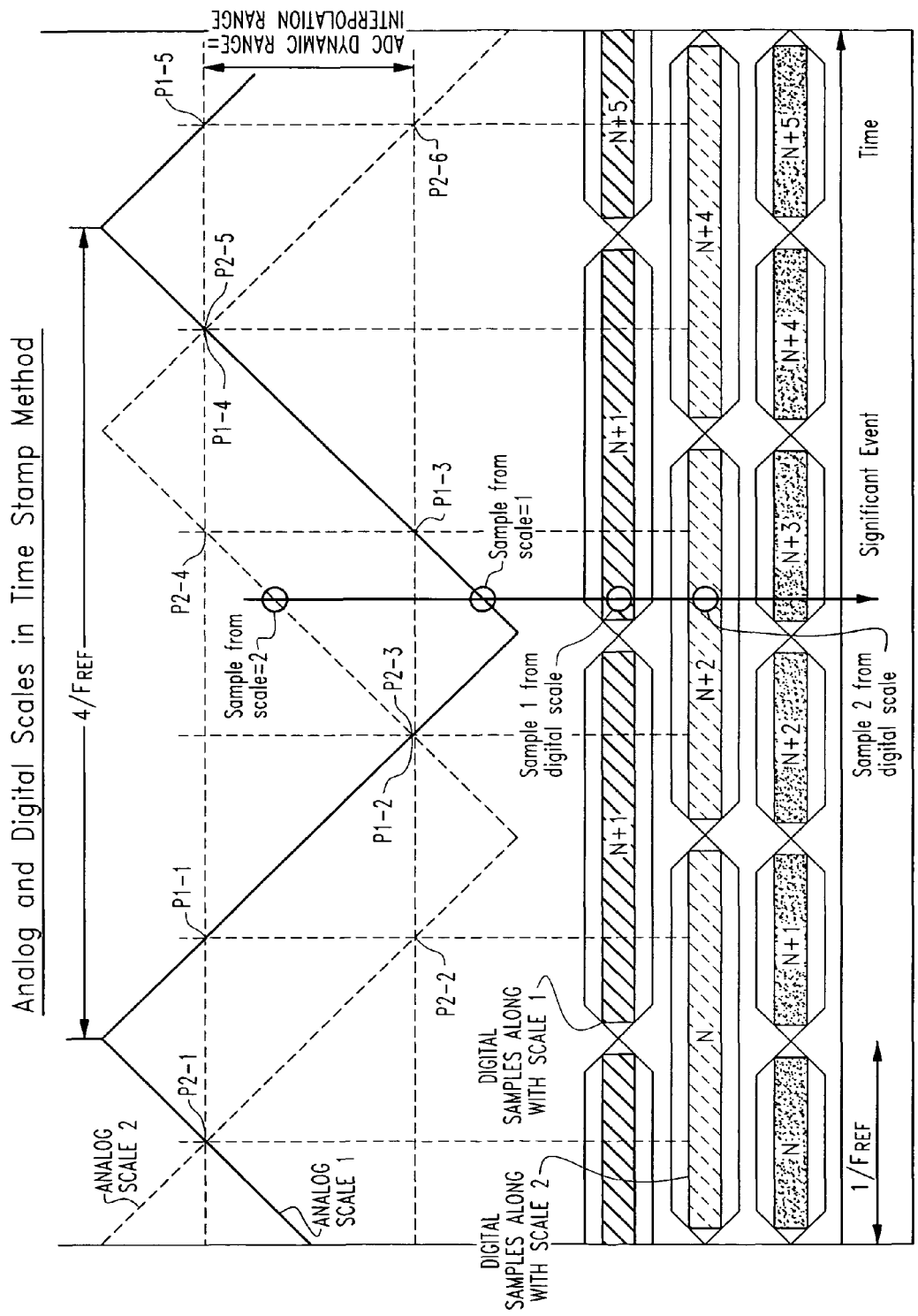
FIG. 4 depicts a graphical representation showing representative analog and digital scales using the time stamp method of the invention.

Referring to FIG. 4, an alternative embodiment of the method of the invention referred to as a time stamp method, a mixed digital and analog time scale is created with a predetermined resolution that stores "time stamps" (relatively instantaneous readings) of a predetermined significant event in the oscillator sense element output signal. For this purpose, the instant the oscillator sense element's output signal crosses the zero-line is a well-defined example of a significant event.

The time stamp embodiment uses a mixed time scale comprised of properly aligned digital and analog scales. The digital scale is created as described above. An analog scale is used to interpolate a period of the digital scale in order to achieve the required resolution.

An analog signal with triangle waveform is preferably used to create the analog scale in this embodiment. It is linear within the interpolation range equal to one unit (period) of the digital scale. Integral (and differential) linearity L should not exceed $$L \leq \text{(time stamp resolution)/(digital scale resolution)} \qquad \text{Eq. 13}$$

Reading a time stamp of a significant event comprises two process steps: 1) storing a time stamp from the digital scale and, 2) sampling the triangle signal at the same instant in time. Analog-to-digital conversion of the sample produces a digital reading from the analog scale. Resolution of the combined scale is defined by a selected analog-to-digital converter or ADC. An N-bit ADC provides an equivalent time scale resolution of:

$$t = 1/(2^N * F_{REF}) \qquad \text{Eq. 14}$$

A 10-bit ADC allows for 1000:1 interpolation with another 24 readings for possible correction.

It is not expected that a triangle signal will be as linear from its peak-to-peak as Eq. 13 requires. This embodiment therefore uses only a part of the triangle signal swing for interpolation purpose. The rest of the swing is outside of the input range of the ADC.

A major timing requirement of the interpolation range is that it be equal to one period of the digital scale. The interpolation ranges are allocated on both the rising and falling edges of the triangle signal. "Unused" portions of the signal are also to be about equal to one period of $F_{REF}$. To satisfy this requirement, the triangle signal frequency $F_{TRIANGLE}$ should preferably be four times lower than $F_{REF}$:

$$F_{TRIANGLE} = F_{REF}/4 \qquad \text{Eq. 15}$$

A single triangle signal has two areas outside of the dynamic range of an ADC. To achieve an uninterrupted interpolation scale, an additional triangle signal is needed to "cover up" the two unusable areas of the first signal.

FIG. 4 shows time and range alignment between the digital scale and two triangle signals.

In essence, the two signals create two analog scales, scale 1 and scale 2. The period of each triangle signal is equal to four periods of the reference frequency $F_{REF}$. One (scale 1 on FIG. 4) is delayed against another by one $F_{REF}$ period.

At the instant of the occurrence of a significant event (see FIG. 4) the following steps are performed:
  Samples are taken from both analog scales and the analog-to-digital conversions are concurrently performed;
  Samples are taken from the digital scale with two registers storing current digital readings from their corresponding scales.

Readings from the analog scales are interpreted as follows: Per the example of a significant event on FIG. 4, the reading from the analog scale 2 is within the dynamic range of an associated ADC and therefore is considered valid. Reading from the analog scale 1 is out of the dynamic range of its ADC and therefore are considered invalid.

A digital circuit implementation of a time scale is a counter clocked by a stable and accurate reference frequency $F_{REF}$. The counter output is electrically connected to a register, which is clocked by the predetermined significant events. The register stores the time stamps of these events. The resolution of the digital scale is equal to the period $1/F_{REF}$.

As a non-limiting example, a 10 kHz maximum deviation changes the nominal frequency $F_{OSC}$=2 MHz (period 500 ns) to $F_{OSC}$+M with frequency 2.01 MHz (period 497.51 ns). The 2.49 ns difference between these periods can be measured with a resolution of $10^{-5}$, or 0.0249 ps. To achieve such resolution with prior art methods, the required reference frequency would need to be $F_{REF}$=40 THz which is impossible given the current state of technology.

Figure 5:
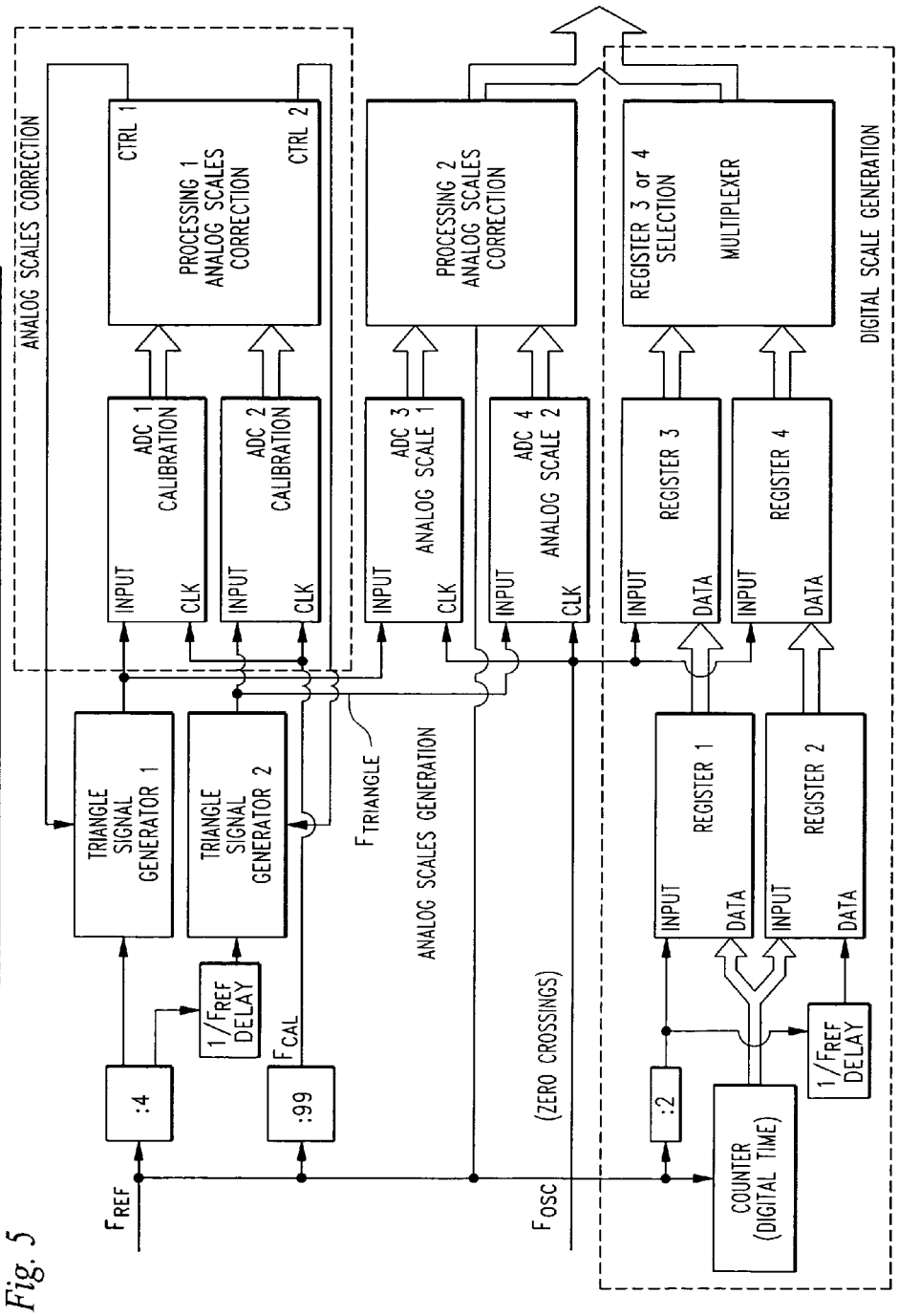
FIG. 5 depicts a preferred embodiment of a circuit for implementing the time stamp method of the invention.

There are now lower bits of a time stamp at the output of the ADC sampling from the analog scale 2 and higher bits of the stamp as a sample 2 from the digital scale. Values P1-1, P1-2, P2-1, P2-2, etc. are used to align the analog scale 1 with scale 2; using, for instance the circuitry of FIG. 5 which discloses a preferred implementation of the time stamp interpolation method of the invention.

The time stamp embodiment has significant advantages if a sine wave signal is used to create the analog scales:
  A sine wave is easy to generate compared to a highly linear triangle signal;
  A sine wave is easy to qualify compared to linearity of a triangle signal;
  Scale alignment is limited to an amplitude control;
  When considering the full power bandwidth of an ADC, a sine wave frequency can be selected with a three to five times higher than the frequency of a triangle signal. Resolution is increased accordingly.

The method allows having time stamps for any significant event such as zero crossings from the rising edges of the oscillator sense element signal. The arithmetic difference between the stamps is the momentary frequency of the oscillator sense element period-after-period.

A hardware implementation (FIG. 5) of this embodiment comprises the analog and digital scales generation blocks and analog scales correction block.

Analog scale correction involves sampling values P1-1, P1-2, P2-1, P2-2, etc. at the scale alignment points, adjusting the signal amplitudes and, if necessary, the phases to satisfy the requirement P1-1=P2-1, P1-2=P2-2. The scale alignment is designed to occur on a frequency $F_{CAL}$ that is not synchronized with $F_{REF}$. This assures that over time both analog scales remain corrected on every step.

The triangle signals have a frequency $F_{TRIANGLE}=F_{REF}/4=250$ MHz. Generated analog and digital scales are shown on FIG. 4 for the triangle signal case.

A sampling rate from scales is defined by frequency of significant events. In a practical case, the ADCs on FIG. 5 will sample at $F_{OSC}=2$ MHz only, at a significantly lower rate than the allowed sampling frequency.

The method operates similarly when a sine wave is used to create the analog scales.

Stroboscopic Method

A further preferred signal processing embodiment is similar to that used in stroboscopes. A time scale of a high-speed signal is transposed into a different time domain where available methods and components can measure the required signal parameters.

The following is a non-limiting example of the stroboscopic method of the invention: A low frequency signal $F_{STROB}$ is created that is synchronous with the oscillator sense element's natural frequency $F_{OSC}$. A controlled time delay is used. The controlled time delay is definable and controllable to small increments with a length definable based on the desired time scale magnification coefficient. For instance, 100× magnification requires a controlled time delay with an increment of $1/(100*F_{RES})$. A sample-and-hold circuit or an ADC converter is clocked with the delayed signal.

The sample-and-hold samples a high-speed signal, $F_{RES}$ in this case. Next sampling instant occurs on the next period of the $F_{STROB}$ signal but one controlled delay step later. The next sample will be taken two steps later, and so on. Output of the sample-and-hold has the same shape as the high-speed signal but its time scale is extended 100× times.

The method best operates when the high-speed signal repeats for long time and has stable and repeatable parameters. Equally important are the stability and repeatability of the low frequency signal and the controlled delay block.

The method is used to extend the time scale of the oscillator sense element's signal by 100× or 1000× times. After that well-known measurement methods are used for processing.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A method for measuring an input rate $\Omega$ of an FM micro-gyro having a modulation frequency $F_M$ and having an oscillator sense element having a nominal frequency $F_{OSC}$ comprising:

defining a first time interval $T_{WN}$ and a second time interval $T_{WP}$, measuring the first time interval and the second time interval by counting a predetermined number of periods of a predetermined reference frequency, measuring the nominal frequency of the oscillator sense element $F_{OSC}$, measuring the modulation frequency $F_M$, calculating a proof mass period $N_W$, measuring a time difference $\Delta t$, calculating a modulation M that produced the measured $\Delta t$ using an iterative method, and, calculating the input rate $\Omega$ by dividing the modulation M by a sensitivity S of the FM micro-gyro.

* * * * *